US010666528B1

(12) United States Patent
Okman et al.

(10) Patent No.: US 10,666,528 B1
(45) Date of Patent: May 26, 2020

(54) DECOUPLING PLATFORM AS A SERVICE PROVIDERS USING A SERVICE MANAGEMENT PLATFORM

(71) Applicant: SAP PORTALS ISRAEL LTD., Ra'anana (IL)

(72) Inventors: Lior Okman, Tzoran (IL); Chaim Bendelac, Kfar Saba (IL); Asher Kirshenbaum, Kefar Sava (IL)

(73) Assignee: SAP Portals Israel Ltd., Ra'anana (IL)

( * ) Notice: Subject to any disclaimer, the term of this patent is extended or adjusted under 35 U.S.C. 154(b) by 0 days.

(21) Appl. No.: 16/202,938

(22) Filed: Nov. 28, 2018

(51) Int. Cl.
*H04L 12/24* (2006.01)
*H04L 29/08* (2006.01)
*G06Q 20/10* (2012.01)
*G06Q 30/04* (2012.01)
*H04L 29/06* (2006.01)

(52) U.S. Cl.
CPC ....... *H04L 41/5054* (2013.01); *G06Q 20/102* (2013.01); *G06Q 30/04* (2013.01); *H04L 41/0293* (2013.01); *H04L 41/5029* (2013.01); *H04L 41/5032* (2013.01); *H04L 65/1073* (2013.01); *H04L 67/16* (2013.01); *H04L 67/2809* (2013.01); *H04L 67/2814* (2013.01); *H04L 67/2838* (2013.01)

(58) Field of Classification Search
CPC ............. H04L 41/5054; H04L 67/2838; H04L 41/0293; H04L 67/2814; H04L 67/16; H04L 67/2809; H04L 65/1073; H04L 41/5032; H04L 41/5029; G06Q 30/04; G06Q 20/102
See application file for complete search history.

(56) References Cited

U.S. PATENT DOCUMENTS

| 7,620,856 | B2 | 11/2009 | Kagan et al. |
| 7,653,902 | B2 | 1/2010 | Bozak |
| 7,752,067 | B2 | 7/2010 | Fotteler et al. |
| 7,788,124 | B2 | 8/2010 | Fotteler et al. |
| 7,873,942 | B2 | 1/2011 | Shaburov et al. |

(Continued)

OTHER PUBLICATIONS

U.S. Appl. No. 15/225,958, filed Aug. 2, 2016, Cohen-Zur et al.
(Continued)

*Primary Examiner* — Michael A Keller
(74) *Attorney, Agent, or Firm* — Fish & Richardson P.C.

(57) ABSTRACT

A registration interface is provided to service providers for registering services with a service management platform. The service management platform is configured to provide access to services from multiple service providers to application developers using a same application developer interface. A registration request is received for a service from a service provider. The service is registered to make the service available to application developers. A provision request for the service is received from an application developer. The provision request is forwarded to a broker associated with the service provider. A provision response is received from the broker. The provision response indicates a status of provisioning an instance of the service at the service provider. A create-binding request for binding information for the service is received from the application developer. Binding information is provided to the application developer, in response to the create-binding request.

20 Claims, 4 Drawing Sheets

(56) References Cited

U.S. PATENT DOCUMENTS

| | | |
|---|---|---|
| 8,285,584 B2 | 10/2012 | Fotteler et al. |
| 8,291,214 B2 | 10/2012 | Helfman et al. |
| 8,370,184 B2 | 2/2013 | Fotteler et al. |
| 8,370,185 B2 | 2/2013 | Fotteler et al. |
| 8,392,231 B2 | 3/2013 | Fotteler et al. |
| 8,639,548 B2 | 1/2014 | Fotteler et al. |
| 8,689,174 B2 | 4/2014 | Shaburov et al. |
| 8,862,159 B2 | 10/2014 | Cohen-Zur |
| 8,937,618 B2 | 1/2015 | Erez et al. |
| 9,098,333 B1 | 8/2015 | Obrecht et al. |
| 9,262,385 B2 | 2/2016 | Ebner |
| 9,277,028 B2 | 3/2016 | Ebner et al. |
| 9,298,455 B1 | 3/2016 | Kolam et al. |
| 9,477,648 B1 | 10/2016 | Carter et al. |
| 9,531,829 B1 | 12/2016 | Anand |
| 9,729,658 B2 * | 8/2017 | Trahan ................ G06F 3/0485 |
| 2007/0250575 A1 | 10/2007 | Tseitlin |
| 2009/0222727 A1 | 9/2009 | George et al. |
| 2009/0228782 A1 | 9/2009 | Fraser et al. |
| 2010/0042986 A1 | 2/2010 | Greiner |
| 2011/0162074 A1 | 6/2011 | Helfman et al. |
| 2013/0041946 A1 | 2/2013 | Joel et al. |
| 2013/0097313 A1 | 4/2013 | Zhang et al. |
| 2013/0212465 A1 | 8/2013 | Kovatch et al. |
| 2013/0226992 A1 | 8/2013 | Bapst et al. |
| 2013/0268676 A1 * | 10/2013 | Martins ................ H04L 67/10 709/226 |
| 2014/0040177 A1 | 2/2014 | Yahali et al. |
| 2014/0052851 A1 | 2/2014 | Nielsen et al. |
| 2014/0101136 A1 | 4/2014 | Mizuno et al. |
| 2014/0115020 A1 | 4/2014 | Colaco et al. |
| 2014/0123020 A1 | 5/2014 | Bleier et al. |
| 2014/0136973 A1 | 5/2014 | Kumar et al. |
| 2014/0189714 A1 | 7/2014 | Lawbaugh et al. |
| 2014/0222914 A1 | 8/2014 | Ebner et al. |
| 2014/0279201 A1 * | 9/2014 | Iyoob ................ G06Q 30/0631 705/26.7 |
| 2014/0281918 A1 | 9/2014 | Wei et al. |
| 2014/0282024 A1 | 9/2014 | Ebner et al. |
| 2014/0303953 A1 | 10/2014 | Bates |
| 2014/0310392 A1 | 10/2014 | Ho |
| 2015/0006730 A1 | 1/2015 | Helfman et al. |
| 2015/0007126 A1 | 1/2015 | Koutyrine et al. |
| 2015/0026239 A1 | 1/2015 | Hofmann et al. |
| 2015/0088968 A1 | 3/2015 | Wei |
| 2015/0089352 A1 | 3/2015 | Conboy et al. |
| 2015/0089389 A1 | 3/2015 | Cohen-Zur et al. |
| 2015/0130820 A1 | 5/2015 | Shu et al. |
| 2015/0281331 A1 | 10/2015 | Steiner et al. |
| 2015/0310126 A1 | 10/2015 | Steiner et al. |
| 2015/0332357 A1 * | 11/2015 | McBride ............ G06Q 30/0601 705/26.1 |
| 2015/0334041 A1 | 11/2015 | Hedbor et al. |
| 2015/0334160 A1 | 11/2015 | Franklin et al. |
| 2015/0381699 A1 | 12/2015 | Eastham et al. |
| 2016/0026611 A1 | 1/2016 | Liu |
| 2016/0094614 A1 | 3/2016 | Ulupinar et al. |
| 2016/0180803 A1 | 6/2016 | Hui |
| 2016/0306895 A1 | 10/2016 | Kaewell et al. |
| 2016/0344649 A1 | 11/2016 | Kravchik et al. |
| 2017/0262266 A1 | 9/2017 | Bendelac et al. |
| 2017/0262825 A1 * | 9/2017 | Conway ................ G06Q 30/00 |
| 2019/0379663 A1 * | 12/2019 | Odenheimer ......... H04L 63/029 |

OTHER PUBLICATIONS

U.S. Appl. No. 15/335,922, filed Oct. 27, 2016, Cohen-Zur et al.
U.S. Appl. No. 15/659,807, filed Jul. 26, 2017, Cohen-Zur et al.
U.S. Appl. No. 16/176,520, filed Oct. 31, 2018, Ebner et al.

* cited by examiner

DECOUPLING PLATFORM AS A SERVICE PROVIDERS USING A SERVICE MANAGEMENT PLATFORM

BACKGROUND

A Platform as a Service (PaaS) model can be used for network application development. A cloud computing provider can provide, to an application developer, hardware and software tools used for application development, using infrastructure located at, or associated with, the cloud computing provider. The application developer, as a user of the PaaS model, can use the infrastructure provided by the cloud computing provider rather than invest in purchasing and building such infrastructure on premise at the application developer.

SUMMARY

The present disclosure describes decoupling platform as a service (PaaS) providers using a service management platform. In an implementation, a registration interface is provided, at a service management platform, to service providers for registering services with the service management platform. The service management platform is configured to provide access to services from multiple service providers to application developers using a same application developer interface. A first registration request is received, through the registration interface, for a first service from a first service provider. The first service is registered, at the service management platform to make the first service available to application developers, in response to the first registration request. A first provision request for the first service is received from an application developer, at the service management platform, through the application developer interface. The first provision request for the first service is forwarded to a first broker associated with the first service provider. A first provision response is received from the first broker. The first provision response indicates a status of provisioning an instance of the first service at the first service provider. A first create-binding request for binding information for the first service is received from the application developer. First binding information for the application developer to use in an application to access the first service is provided to the application developer, in response to the first create-binding request.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a service management platform can standardize wiring and cross-integration of services from multiple cloud computing platforms and vendors. Second, the service management platform can enable developers to choose best-matching services from different vendors and avoid being locked in to a particular vendor. Third, the service management platform can enable service providers to focus on providing specific services, since a given service provider in the service management platform does not need to individually offer a full set of services that may be desired by a given customer. Fourth, the service management platform can treat all services the same way, which can enable all services provided by the platform, even if from multiple, different vendors, to be used more easily and uniformly than if different services were treated differently by the platform. Fifth, the service management platform can define a standard interface for service providers to add services to the platform in a single, unified manner, which can allow services to be consistently onboarded and consumed by developers using a single platform application programming interface (API) or tool. Sixth, the service management platform can assist in wiring efforts of installing and registering two concrete services with one another. Seventh, a developer's learning curve can include the learning of a single tool or API, instead of multiple tools and APIs from multiple vendors. Eighth, a developer customer can receive usage reports, from the service management platform, that show usage of services from multiple, different service providers. Ninth, a developer customer can receive and pay a single bill, for usage from services from multiple, different service providers, rather than paying each provider separately using different billing procedures and interfaces.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes decoupling platform as a service (PaaS) providers using a service management platform, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

PaaS offerings can vary in the breadth, quality and variety of the offered services. PaaS offerings can include, for example, both: 1) hyper-providers that have a broad set of service types, managed with a same set of application programming interfaces (APIs) and tools and 2) providers of differentiated specialty services that offer a fewer set of specialized services. An analogy can be that a hyper-provider is like a supermarket with many offerings and a specialized provider is like a patisserie that specializes in exquisite wedding cakes.

Consequently, application developers that are faced with this variety of service offerings may need to choose between the convenience of using services from a single platform or the ability to use multiple, best matching services from multiple platforms. If using a single platform and vendor, a developer can conveniently use a single management API and tools for provisioning all the services required by an application. However, utilizing services from outside the chosen vendor's offering can be far more difficult. For example, if a developer uses multiple service providers, the developer may need to learn and debug integration with multiple, different APIs. As another example, different vendors may block integration of services with other vendors.

A platform abstraction referred to as a service management platform can be used to standardize the wiring and cross-integration of services from multiple cloud computing platforms and vendors. The service management platform can enable developers to choose best-matching services from different vendors and to avoid vendor lock-in while using a single management API and tool. The service management platform can enable service providers to focus on specific services, without having to implement every conceivable service in-house just to be attractive to developers.

Figure 1:
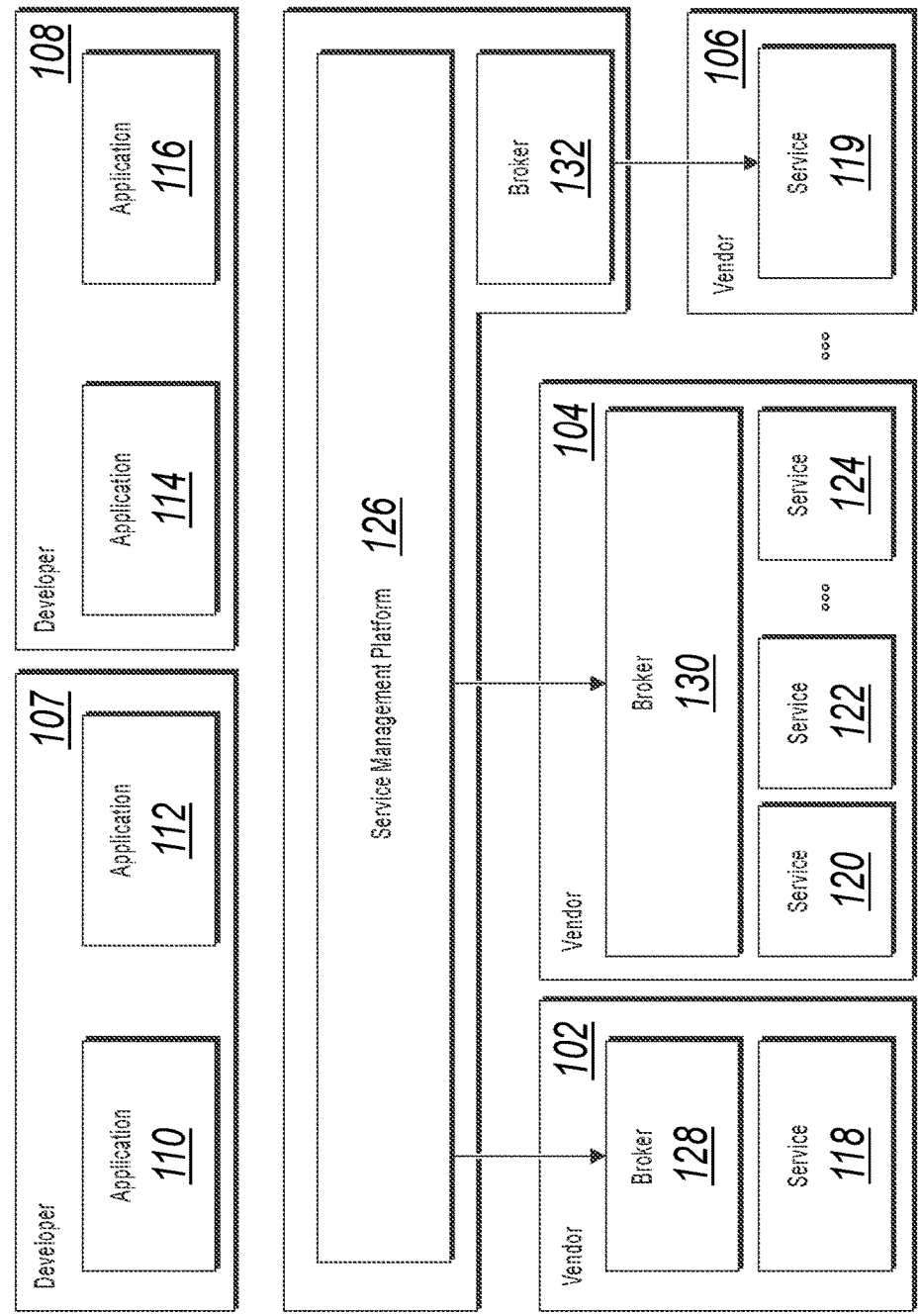
FIG. 1 is a block diagram illustrating an example of a system for decoupling platform as a service (PaaS) providers using a service management platform, according to an implementation of the present disclosure.

FIG. 1 is a block diagram illustrating an example of a system 100 for decoupling PaaS providers using a service management platform, according to an implementation of the present disclosure. Software vendors 102, 104, and 106 can offer one or more services for use by developers (such as, developers 107 and 108) for use in applications (such as, applications 110, 112, 114, and 116).

For the purposes of this disclosure, a service can be considered a managed software offering that can be used by an application. Typically, services expose an API that can be invoked to perform one or more actions provided by the service. Non-interactive services can also be used that perform one or more actions without direct prompting from an application. In some implementations, services can range from a PaaS offering, specific backend services (such as, a database to be used by an application), or Software-as-a-Service (SaaS) offerings in the form of APIs.

A service instance can be considered to be an instantiation of a service offering. A service instance can be a resource that can vary by type of service. For example, a service instance can be a single database executing on a multi-tenant server, a dedicated server cluster, or an account in a web application. In some implementations, an application can be bound to a service instance. A service binding can be a representation of an association between an application and a service instance. Service bindings can include credentials that an application may use to communicate with a service instance. Service bindings can also vary by type of service. In some implementations, a service binding can include credentials that can be used to access a service or resource or information used to make a configuration change.

In some cases, a software vendor can also be referred to as a service provider. A software vendor can be a specialized provider that provides one or a small set of services. For example, the software vendor 102 can offer a specialized service 118 and the software vendor 106 can offer a specialized service 119. A software vendor can also be a hyper-provider that provides a larger set of services than a specialized provider. For example, the software vendor 104 can offer services 120, 122, and 124, among other services, in a large, comprehensive set of offered services. In some cases, a specialized provider can focus and compete on service quality whereas a hyper-provider can focus and compete on service quantity.

To develop an application in a cloud computing platform environment, the developer 107 or the developer 108 can purchase and provision instances for relevant services that a respective application may use. If the developer 107 or the developer 108 choose to purchase different services from different vendors, then the respective developer doesn't have a single unified view of the services which are used in the application being developed. As another example, the developer 107 or the developer 108 may choose to use a same vendor, such as the vendor 104, for all services used by an application.

In some cases, providers have proprietary interfaces and configurations and that require customers to learn and to use the proprietary interfaces and configurations to consume services through the particular provider. Developers may prefer to limit applications to the services provided by a main vendor, because using multiple vendors may be more difficult to manage and more difficult to implement than using a single vendor. However, if a developer uses only a main vendor, an application may be limited to services which are available from that main vendor.

In general, a developer may have to make tradeoffs when deciding which and how many providers to use. For example, each provider may offer different and possibly unique services that may be of use and of interest to a consumer, but each provider that a consumer uses can result in a learning curve cost with respect to each different provider's interfaces and configurations. To access additional services from a larger set of providers, a customer may take on a larger overall learning curve cost. A customer who decides to use multiple service providers may have to learn multiple interfaces for service-related operations (for example, for service management, provisioning, discovery, reporting, billing, backup, and restore). If a customer wants to lessen their learning curve cost by using less providers, the customer may have to accept having access to a smaller set of services.

Although a given service provider may offer a limited/finite set of services, the developer 107 and the developer 108 can access multiple services from multiple, different providers through the same interface by using a service management platform 126. In some implementations, the service management platform 126 can be configured to mediate between developers and service providers to enable customers to find and use desired services. In some cases, the service management platform 126 is a virtual platform that decouples PaaS providers and services by decoupling services from a physical platform executing the services.

Services can be onboarded into the service management platform 126 from multiple vendors and can then be provisioned and consumed in a conventional manner, allowing for standard, sharable services that can be used by developers across service providers and in a consistent manner. As an example, the service management platform 126 can: 1) permit both a third-party cloud computing system and a database provider to register with the service management platform 126 and 2) orchestrate connectivity between a database instance and a third-party cloud computing system instance.

In some cases, the service management platform 126 can provide specific security mechanisms that establish trust (both technically and commercially) between service vendors and service consumers. The service management platform 126 can provide both technical mediation (for usage) and commercial mediation (for payment). In some implementations, the service management platform 126 can offer a complete solution that manages a group of features, from networking to commercial, to enable the consumption of services from heterogeneous service providers through a single middleman component.

The service management platform 126 can provide a single point of integration between various service vendors that register with the service management platform 126. In some cases, a given vendor can expose one or more services to the service management platform 126. Service vendors can also receive service management and usage context from the service management platform 126.

In some implementations, the service management platform 126 can provide an API that defines an interface between the service management platform 126 and service providers. Since the integration between the service management platform 126 and a specific service includes a well-defined service interface which uses regular, standard APIs for that service, it can be easy to integrate any service by any vendor into the service management platform 126. The service management platform 126 can provide a standard interface for providers and developers that allows for the following operations: 1) retrieving a catalog of available services; 2) provisioning a new instance of a service; 3) de-provisioning an existing instance of a service; 4) updating/managing parameters of an existing service; 5) binding two concrete instances of existing services together, to make it easy to integrate the existing services; 6) unbinding two previously bound services; 7) usage reporting; and 8) billing.

The service management platform 126 can also provide a set of mediation, connectivity, and handshake technologies. For example, the service management platform 126 can connect to a broker executing in a service provider system. Connections can be established, transparently to a developer customer of the service management platform 126, between the service management platform 126 and a service provider broker during service registration, provisioning, binding, and service use.

For example, the vendor 102 and the vendor 104 include the broker 128 or the broker 130, respectively. If a service exists for which a particular vendor doesn't provide a broker, another implementer can provide a broker for that service based on standard APIs exposed by that vendor. For example, the service management platform 126 is associated with a broker 132 that can be configured to interact with the vendor 106.

Brokers manage the lifecycle of services. The service management platform 126 interacts with the brokers 128, 130, and 132 to provision and manage service instances and service bindings. A single broker of a vendor can expose multiple services, or a vendor can include multiple brokers that each expose a service per broker. A broker can implement a service broker API and respond to requests from the service management platform 126 for provisioning, binding, unbinding, and de-provisioning.

Provisioning can reserve a service instance on a service. When a broker receives a provision request from the service management platform 126, the broker can perform an action to create a new resource. What provisioning represents and includes can vary by service type. For example, for a database service, provisioning can result in an empty dedicated database server executing on its own virtual machine or an empty schema on a shared database server. As another example, for non-database services, provisioning can result in creation of an account on a multi-tenant SaaS application.

The service management platform 126 can include or provide software that manages cloud computing environments into which applications and brokers are provisioned. Since the service management platform 126 is exposed to all the catalogs provided by all registered vendors, the service management platform 126 can provide an aggregated catalog that represents a unified marketplace interface for developers.

The developer 107 and the developer 108 can each have a customer context/managed account in the service management platform 126. The developer 107 and the developer 108 can use a single interface to manage all the services used by a respective application. Developers can use the APIs and tools provided by the service management platform 126 to provision and gain access to any services registered in the service management platform 126. Developers who are customers of the service management platform 126 can provision services from any of the registered service providers using a single, standardized interface. Developer customers of the service management platform 126 can consistently manage, using a same approach, all services used through the service management platform 126. In some implementations, the service management platform 126 permits a developer customer to access a variety of services from multiple service providers, selecting an overall set of services that best meet the customer's needs, while becoming familiar and experienced with a single interface.

Developers can take advantage of the fact that the service management platform 126 can manage services and interact with vendor brokers, rather than the developer being required to directly provision services from vendors. The service management platform 126 can orchestrate actual provisioning operations with the various vendors, on behalf of a respective developer. The developer need not be aware of the source of any specific service—the service management platform 126 can act as a service provider façade.

A developer customer can receive usage reports, from the service management platform 126, that show usage of services from multiple, different service providers. A developer customer can receive and pay a single bill, for usage from services from multiple, different service providers, rather than paying each provider separately using different billing procedures and interfaces. Additionally, service providers can receive payment, and reports, from the service management platform 126.

Figure 2:
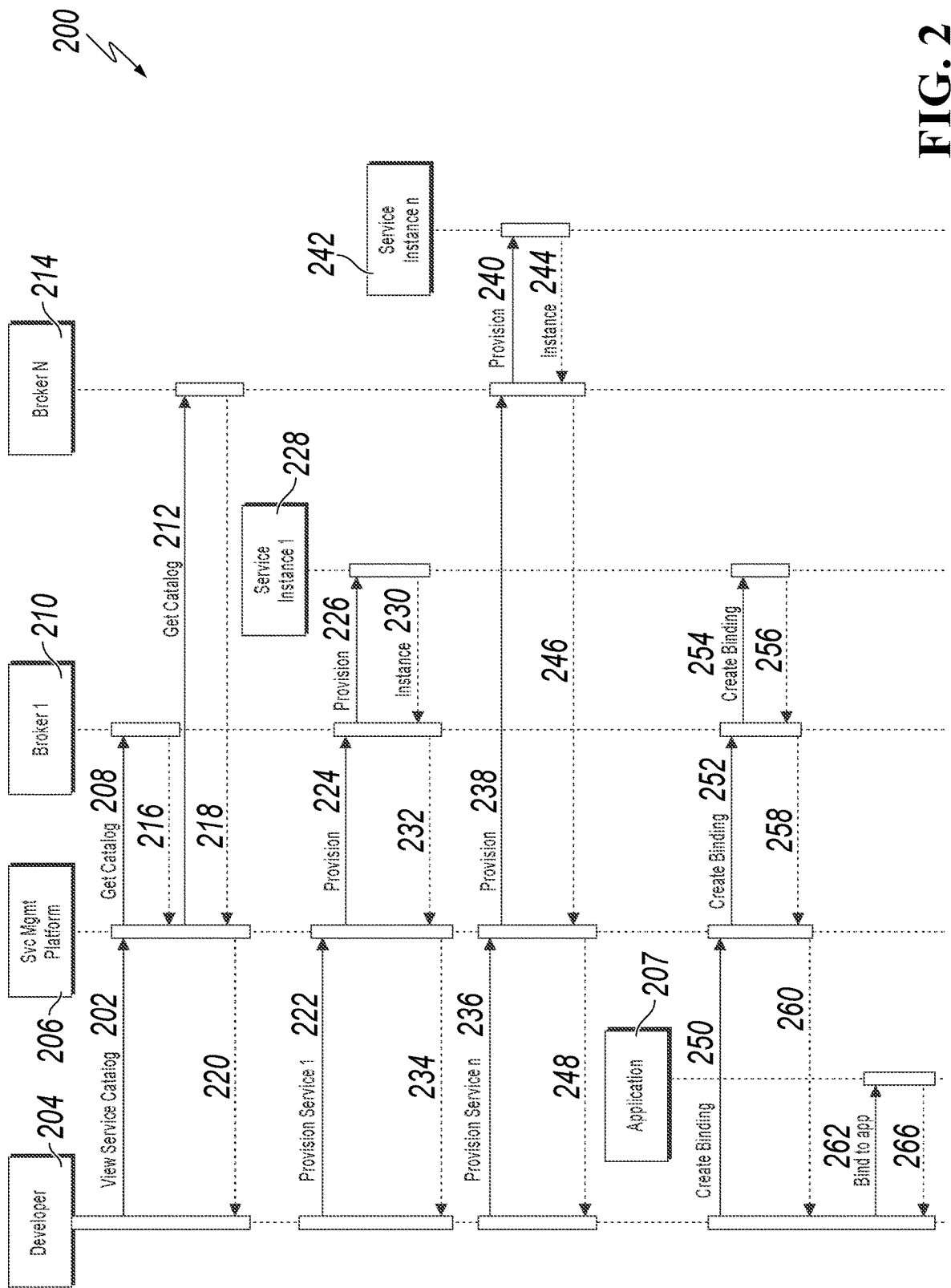
FIG. 2 is a swim lane diagram illustrating an example of a computer-implemented method for decoupling PaaS providers using a service management platform, according to an implementation of the present disclosure.

FIG. 2 is a swim lane diagram illustrating an example of a computer-implemented method 200 for decoupling PaaS providers using a service management platform, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be executed in parallel, in combination, in loops, or in any order.

At 202, a developer 204 (or a tool used by the developer 204) sends a view service catalog request to a service management platform 206 to query the service management platform 206 for available services. In response to the view service request, the service management platform 206 can aggregate information about services that have been registered from brokers across multiple vendors. From 202, method 200 proceeds to 208.

At 208, the service management platform 206 sends a first get-catalog request to a first broker 210. The service management platform 206 can send get-catalog requests to one or more other brokers. For example, at 212, the service management platform 206 sends a second get-catalog request to a second broker 214. The service management platform 206 can query a catalog endpoint from all registered brokers in order to present an aggregated catalog. From 212, method 200 proceeds to 216.

At 216, the first broker 210 returns catalog information to the service management platform 206 in response to the first get-catalog request. The catalog information can be a list of services available through the first broker 210. From 216, method 200 proceeds to 218.

At 218, the second broker 210 returns catalog information to the service management platform 206 in response to the second get-catalog request. From 218, method 200 proceeds to 220.

At 220, the service management platform 206 sends aggregated catalog information to the developer 204 in response to the view service catalog request. From 220, method 200 proceeds to 222.

As described in the following, the developer 204 can issue provision requests against the service management platform 206 for those services which are of interest for an application 207 developed by the developer 204. The service management platform 206 can contact the brokers for those services and provision instances of those services on behalf of the developer 204. For instance, at 222, the developer sends a provision-service-one request to the service management platform 206 to provision a first service. From 222, method 200 proceeds to 224.

At 224, the service management platform 206 sends a first provision request to the first broker 210. From 224, method 200 proceeds to 226.

At 226, the first broker 210 provisions an instance 228 of the first service. From 226, method 200 proceeds to 230.

At 230, the instance 228 sends a provisioning status to the first broker 210. From 230, method 200 proceeds to 232.

At 232, the first broker 210 sends a provisioning response to the service management platform 206, in response to the first provision request. From 232, method 200 proceeds to 234.

At 234, the service management platform 206 sends a provisioning response (which can be a forwarded response) to the developer 204. From 234, method 200 proceeds to 236.

At 236, the developer sends a provision-service-n request to the service management platform 206 to provision a second service. From 236, method 200 proceeds to 238.

At 238, the service management platform 206 sends a second provision request, to the second broker 214. From 238, method 200 proceeds to 240.

At 240, the second broker 214 provisions an instance 242 of the second service. From 240, method 200 proceeds to 244.

At 244, the instance 242 sends a provisioning status to the second broker 214. From 244, method 200 proceeds to 246.

At 246, the second broker 214 sends a provisioning response to the service management platform 206, in response to the second provision request. From 246, method 200 proceeds to 248.

At 248, the service management platform 206 sends a provisioning response (which can be a forwarded response) to the developer 204. From 248, method 200 proceeds to 250.

At 250, the developer 204 sends a create-binding request to the service management platform 206 for binding information to bind the application 207 to the first service. A similar create-binding request can be sent for binding information for the second service (but is not shown). From 250, method 200 proceeds to 252.

At 252, the service management platform 206 forwards the create-binding request to the first broker 210. From 252, method 200 proceeds to 254.

At 254, the first broker 210 forwards the create-binding request to the instance 228. From 254, method 200 proceeds to 256.

At 256, the instance 228 sends binding information to the first broker 210 in response to the create-binding request. The binding information can include credentials which allow the application 207 to access the first service. From 256, method 200 proceeds to 258.

At 258, the first broker 210 forwards the binding information to the service management platform 206. From 258, method 200 proceeds to 260.

At 260, the service management platform 206 forwards the binding information to the developer 204. From 260, method 200 proceeds to 262.

At 262, the developer 204 uses the received binding information to bind the application 207 to the first service. From 262, method 200 proceeds to 266.

At 266, the application 207 sends a binding response to the developer 204. Although a binding to the first service is discussed, the application 207 can also be bound to the second service. After 266, method 200 can stop.

Figure 3:
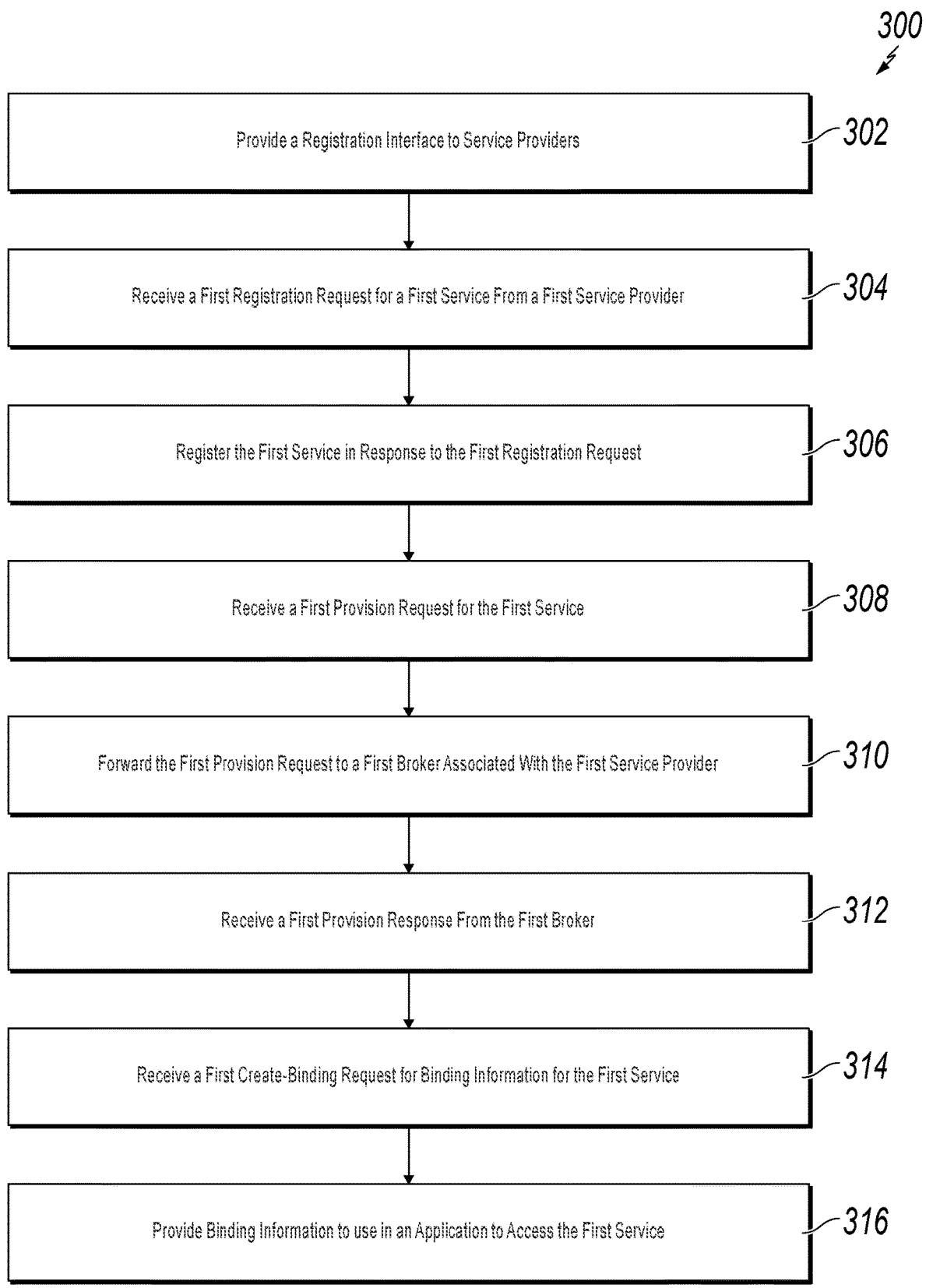
FIG. 3 is a flowchart illustrating an example of a computer-implemented method for decoupling PaaS providers using a service management platform, according to an implementation of the present disclosure.

FIG. 3 is a flowchart illustrating an example of a computer-implemented method 300 for decoupling PaaS providers using a service management platform, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be executed in parallel, in combination, in loops, or in any order.

At 302, a registration interface is provided, at a service management platform, to service providers for registering services with the service management platform. The service management platform is configured to provide access to services from multiple service providers to application developers using a same application developer interface. From 302, method 300 proceeds to 304.

At 304, a first registration request is received, through the registration interface, for a first service from a first service provider. Other registration requests can be received from other service providers. For example, a second registration request can be received, through the registration interface, for a second service from a second service provider. From 304, method 300 proceeds to 306.

At 306, the first service is registered, in response to the first registration request, at the service management platform, to make the first service available to application developers through the service management platform. Other services can be registered in response to other registration requests, such as the second registration request, to make the other service(s) available to application developers through the service management platform. The service management platform can provide a service-discovery interface for applications developers to discover services available through the service management platform. A view-catalog request can be received, through the service-discovery interface, from the application developer. A service catalog can be provided to the application developer, in response to the view-catalog request, which includes information describing the first service, the second service, and any other services available through the service management platform. From 306, method 300 proceeds to 308.

At 308, a first provision request for the first service is received, at the service management platform, through the application developer interface, from an application developer. Other provision requests can be received, from the same or a different application developer, for other services, from the same or other service providers. For example, a second provision request for the second service can be received, at the service management platform and through the same application developer interface, from the application developer. From 308, method 300 proceeds to 310.

At 310, the first provision request for the first service is forwarded to a first broker associated with the first service provider. Other received provision requests for other services can be forwarded to respective brokers associated with other respective services. For example, a second provision request for the second service can be forwarded to a second broker associated with the second service provider. From 310, method 300 proceeds to 312.

At 312, a first provision response is received from the first broker. The first provision response indicates a status of provisioning an instance of the first service at the first service provider. Other provision responses can be received in response to other provision requests. For example, the service management platform can receive a second provision response from the second broker in response to the second provision request. From 312, method 300 proceeds to 314.

At 314, a first create-binding request is received, from the application developer, for binding information for the first service. Other create-binding requests can be received from the same or a different application developer for other services. For example, a second create-binding request can be received from the application developer for the second service. From 314, method 300 proceeds to 316.

At 316, first binding information is provided, to the application developer and in response to the first create-binding request, for the application developer to use in an application to access the first service. Other binding information can be provided in response to other create-binding requests. For example, second binding information can be provided, to the application developer and in response to the second create-binding request, for the application developer to use in an application to access the second service. A usage report can be provided, to the application developer, which describes use of the first service, the second service, and possibly other services, by the application developer in the application (and possibly other applications). A single invoice can be provided to the application developer for use of the first service, the second service, and any other services access through the service management platform. A single payment can be received, from the application developer, for use of the first service, the second service, and other services, through the service management platform, for a particular billing period. After 316, method 300 can stop.

Figure 4:
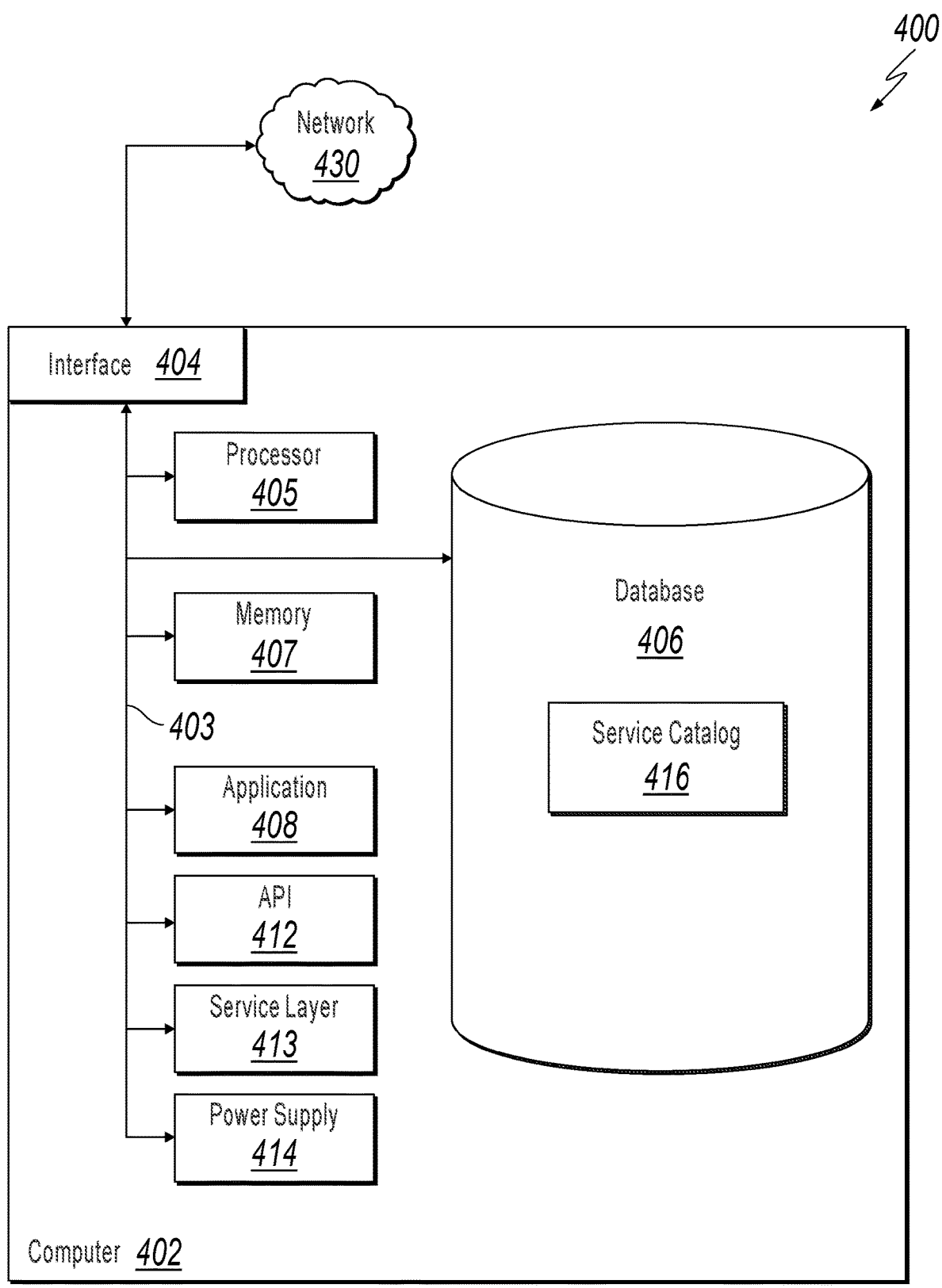
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud-computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. As illustrated, the Database 406 holds the previously described service catalog 416.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method includes: providing, at a service management platform, a registration interface to service providers for registering services with the service management platform, wherein the service management platform is configured to provide access to services from multiple service providers to application developers using a same application developer interface; receiving, through the registration interface, a first registration request for a first service from a first service provider; registering, in response to the first registration request, the first service at the service management platform to make the first service available to application developers; receiving, at the service management platform, through the application developer interface, and from an application developer, a first provision request for the first service; forwarding the first provision request for the first service to a first broker associated with the first service provider; receiving a first provision response from the first broker, wherein the first provision response indicates a status of provisioning an instance of the first service at the first service provider; receiving, from the application developer, a first create-binding request for binding information for the first service; and providing, to the application developer and in response to the first create-binding request, first binding information for the application developer to use in an application to access the first service.

The foregoing and other described implementations can each, optionally, include one or more of the following features:

A first feature, combinable with any of the following features, wherein a second registration request is received for a second service from a second service provider. The second service is registered, in response to the second registration request, at the service management platform to make the second service available to application developers.

A second feature, combinable with any of the following features, wherein a second provision request for the second service is received, at the service management platform, through the application developer interface, and from the application developer. The second provision request for the second service is forwarded to a second broker associated with the second service provider. A second provision response is received from the second broker. The second provision response indicates a status of provisioning an instance of the second service at the second service provider. A second create-binding request for binding information for the second service is received, from the application developer. Second binding information for the application developer to use in the application to access the second service is provided, to the application developer, in response to the second create-binding request.

A third feature, combinable with any of the following features, wherein a service-discovery interface is provided, at the service management platform, for applications developers to discover services available through the service management platform. A view-catalog request is received, through the service-discovery interface, from the application developer. A service catalog is provided to the application developer, in response to the view-catalog request. The service catalog includes information describing the first service and the second service.

A fourth feature, combinable with any of the following features, wherein a usage report is provided, to the application developer, which describes use of the first service and the second service by the application.

A fifth feature, combinable with any of the following features, wherein a single invoice is provided to the application developer for use of both the first service and the second service.

A sixth feature, combinable with any of the following features, wherein a single payment is received, from the application developer, for use of both the first service and the second service.

In a second implementation, a non-transitory, computer-readable medium stores one or more instructions executable by a computer system to perform operations comprising: providing, at a service management platform, a registration interface to service providers for registering services with the service management platform, wherein the service management platform is configured to provide access to services from multiple service providers to application developers using a same application developer interface; receiving, through the registration interface, a first registration request for a first service from a first service provider; registering, in response to the first registration request, the first service at the service management platform to make the first service available to application developers; receiving, at the service management platform, through the application developer interface, and from an application developer, a first provision request for the first service; forwarding the first provision request for the first service to a first broker associated with the first service provider; receiving a first provision response from the first broker, wherein the first provision response indicates a status of provisioning an instance of the first service at the first service provider; receiving, from the application developer, a first create-binding request for binding information for the first service; and providing, to the application developer and in response to the first create-binding request, first binding information for the application developer to use in an application to access the first service.

The foregoing and other described implementations can each, optionally, include one or more of the following features:

A first feature, combinable with any of the following features, wherein a second registration request is received for a second service from a second service provider. The second service is registered, in response to the second registration request, at the service management platform to make the second service available to application developers.

A second feature, combinable with any of the following features, wherein a second provision request for the second service is received, at the service management platform, through the application developer interface, and from the application developer. The second provision request for the second service is forwarded to a second broker associated with the second service provider. A second provision response is received from the second broker. The second provision response indicates a status of provisioning an instance of the second service at the second service provider. A second create-binding request for binding information for the second service is received, from the application developer. Second binding information for the application developer to use in the application to access the second service is provided, to the application developer, in response to the second create-binding request.

A third feature, combinable with any of the following features, wherein a service-discovery interface is provided, at the service management platform, for applications developers to discover services available through the service management platform. A view-catalog request is received, through the service-discovery interface, from the application developer. A service catalog is provided to the application developer, in response to the view-catalog request. The service catalog includes information describing the first service and the second service.

A fourth feature, combinable with any of the following features, wherein a usage report is provided, to the application developer, which describes use of the first service and the second service by the application.

A fifth feature, combinable with any of the following features, wherein a single invoice is provided to the application developer for use of both the first service and the second service.

A sixth feature, combinable with any of the following features, wherein a single payment is received, from the application developer, for use of both the first service and the second service.

In a third implementation, A computer-implemented system comprises one or more computers and one or more computer memory devices interoperably coupled with the one or more computers that have tangible, non-transitory, machine-readable media storing one or more instructions. The instructions, when executed by the one or more computers, perform one or more operations comprising: providing, at a service management platform, a registration interface to service providers for registering services with the service management platform, wherein the service management platform is configured to provide access to services from multiple service providers to application developers using a same application developer interface; receiving, through the registration interface, a first registration request for a first service from a first service provider; registering, in response to the first registration request, the first service at the service management platform to make the first service available to application developers; receiving, at the service management platform, through the application developer interface, and from an application developer, a first provision request for the first service; forwarding the first provision request for the first service to a first broker associated with the first service provider; receiving a first provision response from the first broker, wherein the first provision response indicates a status of provisioning an instance of the first service at the first service provider; receiving, from the application developer, a first create-binding request for binding information for the first service; and providing, to the application developer and in response to the first create-binding request, first binding information for the application developer to use in an application to access the first service.

The foregoing and other described implementations can each, optionally, include one or more of the following features:

A first feature, combinable with any of the following features, wherein a second registration request is received for a second service from a second service provider. The second service is registered, in response to the second registration request, at the service management platform to make the second service available to application developers.

A second feature, combinable with any of the following features, wherein a second provision request for the second service is received, at the service management platform, through the application developer interface, and from the application developer. The second provision request for the second service is forwarded to a second broker associated with the second service provider. A second provision response is received from the second broker. The second provision response indicates a status of provisioning an instance of the second service at the second service provider. A second create-binding request for binding information for the second service is received, from the application developer. Second binding information for the application developer to use in the application to access the second service is provided, to the application developer, in response to the second create-binding request.

A third feature, combinable with any of the following features, wherein a service-discovery interface is provided, at the service management platform, for applications developers to discover services available through the service management platform. A view-catalog request is received, through the service-discovery interface, from the application developer. A service catalog is provided to the application developer, in response to the view-catalog request. The service catalog includes information describing the first service and the second service.

A fourth feature, combinable with any of the following features, wherein a usage report is provided, to the application developer, which describes use of the first service and the second service by the application.

A fifth feature, combinable with any of the following features, wherein a single invoice is provided to the application developer for use of both the first service and the second service.

A sixth feature, combinable with any of the following features, wherein a single payment is received, from the application developer, for use of both the first service and the second service.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs executing on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   providing, at a service management platform, a registration interface to service providers for registering services with the service management platform, wherein the service management platform is configured to provide access to services from multiple service providers to application developers using a same application developer interface;
   receiving, through the registration interface, a first registration request for a first service from a first service provider;
   registering, in response to the first registration request, the first service at the service management platform to make the first service available to application developers;
   receiving, at the service management platform, through the application developer interface, and from an application developer, a first provision request for the first service;
   forwarding the first provision request for the first service to a first broker associated with the first service provider;
   receiving a first provision response from the first broker, wherein the first provision response indicates a status of provisioning an instance of the first service at the first service provider;
   receiving, from the application developer, a first create-binding request for binding information for the first service; and
   providing, to the application developer and in response to the first create-binding request, first binding information for the application developer to use in an application to access the first service.

2. The computer-implemented method of claim 1, comprising:
   receiving, through the registration interface, a second registration request for a second service from a second service provider; and
   registering, in response to the second registration request, the second service at the service management platform to make the second service available to application developers.

3. The computer-implemented method of claim 2, comprising:
    receiving, at the service management platform, through the application developer interface, and from the application developer, a second provision request for the second service;
    forwarding the second provision request for the second service to a second broker associated with the second service provider;
    receiving a second provision response from the second broker, wherein the second provision response indicates a status of provisioning an instance of the second service at the second service provider;
    receiving, from the application developer, a second create-binding request for binding information for the second service; and
    providing, to the application developer and in response to the second create-binding request, second binding information for the application developer to use in the application to access the second service.

4. The computer-implemented method of claim 2, comprising:
    providing, at the service management platform, a service-discovery interface for applications developers to discover services available through the service management platform;
    receiving a view-catalog request, through the service-discovery interface, from the application developer; and
    providing a service catalog to the application developer, in response to the view-catalog request, wherein the service catalog includes information describing the first service and the second service.

5. The computer-implemented method of claim 2, comprising providing a usage report, to the application developer, which describes use of the first service and the second service by the application.

6. The computer-implemented method of claim 5, comprising providing a single invoice to the application developer for use of both the first service and the second service.

7. The computer-implemented method of claim 6, comprising receiving a single payment, from the application developer, for use of both the first service and the second service.

8. A non-transitory, computer-readable medium storing one or more instructions executable by a computer system to perform operations comprising:
    providing, at a service management platform, a registration interface to service providers for registering services with the service management platform, wherein the service management platform is configured to provide access to services from multiple service providers to application developers using a same application developer interface;
    receiving, through the registration interface, a first registration request for a first service from a first service provider;
    registering, in response to the first registration request, the first service at the service management platform to make the first service available to application developers;
    receiving, at the service management platform, through the application developer interface, and from an application developer, a first provision request for the first service;
    forwarding the first provision request for the first service to a first broker associated with the first service provider;
    receiving a first provision response from the first broker, wherein the first provision response indicates a status of provisioning an instance of the first service at the first service provider;
    receiving, from the application developer, a first create-binding request for binding information for the first service; and
    providing, to the application developer and in response to the first create-binding request, first binding information for the application developer to use in an application to access the first service.

9. The non-transitory, computer-readable medium of claim 8, the operations further comprising:
    receiving, through the registration interface, a second registration request for a second service from a second service provider; and
    registering, in response to the second registration request, the second service at the service management platform to make the second service available to application developers.

10. The non-transitory, computer-readable medium of claim 9, the operations further comprising:
    receiving, at the service management platform, through the application developer interface, and from the application developer, a second provision request for the second service;
    forwarding the second provision request for the second service to a second broker associated with the second service provider;
    receiving a second provision response from the second broker, wherein the second provision response indicates a status of provisioning an instance of the second service at the second service provider;
    receiving, from the application developer, a second create-binding request for binding information for the second service; and
    providing, to the application developer and in response to the second create-binding request, second binding information for the application developer to use in the application to access the second service.

11. The non-transitory, computer-readable medium of claim 9, the operations further comprising:
    providing, at the service management platform, a service-discovery interface for applications developers to discover services available through the service management platform;
    receiving a view-catalog request, through the service-discovery interface, from the application developer; and
    providing a service catalog to the application developer, in response to the view-catalog request, wherein the service catalog includes information describing the first service and the second service.

12. The non-transitory, computer-readable medium of claim 9, the operations further comprising providing a usage report, to the application developer, which describes use of the first service and the second service by the application.

13. The non-transitory, computer-readable medium of claim 12, the operations further comprising providing a single invoice to the application developer for use of both the first service and the second service.

14. A computer-implemented system, comprising:
    one or more computers; and one or more computer memory devices interoperably coupled with the one or more computers and having tangible, non-transitory, machine-readable media storing one or more instructions that, when executed by the one or more computers, perform one or more operations comprising:

provferring, at a service management platform, a registration interface to service providers for registering services with the service management platform, wherein the service management platform is configured to provide access to services from multiple service providers to application developers using a same application developer interface;

receiving, through the registration interface, a first registration request for a first service from a first service provider;

registering, in response to the first registration request, the first service at the service management platform to make the first service available to application developers;

receiving, at the service management platform, through the application developer interface, and from an application developer, a first provision request for the first service;

forwarding the first provision request for the first service to a first broker associated with the first service provider;

receiving a first provision response from the first broker, wherein the first provision response indicates a status of provisioning an instance of the first service at the first service provider;

receiving, from the application developer, a first create-binding request for binding information for the first service; and providing, to the application developer and in response to the first create-binding request, first binding information for the application developer to use in an application to access the first service.

15. The computer-implemented system of claim 14, the operations further comprising:

receiving, through the registration interface, a second registration request for a second service from a second service provider; and registering, in response to the second registration request, the second service at the service management platform to make the second service available to application developers.

16. The computer-implemented system of claim 15, the operations further comprising:

receiving, at the service management platform, through the application developer interface, and from the application developer, a second provision request for the second service;

forwarding the second provision request for the second service to a second broker associated with the second service provider;

receiving a second provision response from the second broker, wherein the second provision response indicates a status of provisioning an instance of the second service at the second service provider;

receiving, from the application developer, a second create-binding request for binding information for the second service; and providing, to the application developer and in response to the second create-binding request, second binding information for the application developer to use in the application to access the second service.

17. The computer-implemented system of claim 15, the operations further comprising:

providing, at the service management platform, a service-discovery interface for applications developers to discover services available through the service management platform;

receiving a view-catalog request, through the service-discovery interface, from the application developer; and providing a service catalog to the application developer, in response to the view-catalog request, wherein the service catalog includes information describing the first service and the second service.

18. The computer-implemented system of claim 15, the operations further comprising providing a usage report, to the application developer, which describes use of the first service and the second service by the application.

19. The computer-implemented system of claim 18, the operations further comprising providing a single invoice to the application developer for use of both the first service and the second service.

20. The computer-implemented system of claim 19, the operations further comprising receiving a single payment, from the application developer, for use of both the first service and the second service.

* * * * *